United States Patent
Kobayashi

(10) Patent No.: US 11,528,758 B2
(45) Date of Patent: Dec. 13, 2022

(54) WIRELESS COMMUNICATION DEVICE AND WIRELESS COMMUNICATION METHOD

(71) Applicant: TOSHIBA TEC KABUSHIKI KAISHA, Tokyo (JP)

(72) Inventor: Tohru Kobayashi, Numazu (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/179,583

(22) Filed: Feb. 19, 2021

(65) Prior Publication Data
US 2021/0298096 A1 Sep. 23, 2021

(30) Foreign Application Priority Data
Mar. 19, 2020 (JP) .............................. JP2020-049424

(51) Int. Cl.
*H04W 76/10* (2018.01)
*H04W 56/00* (2009.01)
*H04L 5/00* (2006.01)

(52) U.S. Cl.
CPC ........... *H04W 76/10* (2018.02); *H04L 5/0048* (2013.01); *H04W 56/004* (2013.01)

(58) Field of Classification Search
CPC ............... H04W 76/10; H04W 56/004; H04W 52/0258; H04W 52/0274; H04W 52/0254; H04L 5/0048
See application file for complete search history.

(56) References Cited

U.S. PATENT DOCUMENTS

| | | | | |
|---|---|---|---|---|
| 7,518,511 | B1* | 4/2009 | Panj | G07G 1/009 340/568.1 |
| 2002/0122403 | A1* | 9/2002 | Hashem | H04W 40/02 370/335 |
| 2012/0099543 | A1* | 4/2012 | Yang | H04W 74/006 370/329 |
| 2012/0178367 | A1* | 7/2012 | Matsumoto | G06K 19/0707 455/41.1 |
| 2021/0298096 | A1* | 9/2021 | Kobayashi | H04W 52/0254 |

FOREIGN PATENT DOCUMENTS

JP 2015-125770 7/2015

* cited by examiner

*Primary Examiner* — Jamal Javaid
(74) *Attorney, Agent, or Firm* — Foley & Lardner LLP

(57) ABSTRACT

According to one example embodiment, a wireless communication device having an associated first serial code. The wireless communication device includes a receiver, a processor, and a transmitter. The wireless communication device starts up intermittently. The receiver receives a second serial code different from the first serial code from a second the wireless communication device different from the wireless communication device. The processor stores the second serial code received by the receiver in a memory, and acquires the first serial code and the second serial code from the memory. The transmitter transmits the first serial code and the second serial code.

12 Claims, 3 Drawing Sheets

| SERIAL CODE | TTL |
|---|---|
| D | — |
| A | 1 |
| B | 3 |
| C | 2 |

WIRELESS COMMUNICATION DEVICE AND WIRELESS COMMUNICATION METHOD

CROSS-REFERENCE TO RELATED APPLICATION

This application is based on and claims priority to Japanese Patent Application No. 2020-049424, filed on Mar. 19, 2020, the entire contents of which are incorporated herein by reference.

FIELD

Embodiments described herein relate generally to a wireless communication device and a wireless communication method.

BACKGROUND

In remote maintenance of point of sales (POS) products, a system is provided to perform long-distance wireless transmission of a user's product serial code to a maintenance center on a regular basis in order to track the location of a non-operating POS product which is in a packed state or a stopped state at night.

Because AC power supply cannot be used in a non-operational product, a wireless communication device attached to the non-operation product is powered by a battery. In this case, in order to reduce battery consumption, the wireless communication device starts up about once every few hours and wirelessly transmits a serial code of its own product.

DETAILED DESCRIPTION

In the above-described system, there is a possibility that the reachability of wireless transmission will be insufficient due to radio wave conditions (e.g., the presence of obstacles, a distance from a base station, and the like) in an environment where a product is present.

An object to be solved by an exemplary embodiment is to improve a reaching rate of a serial code of a product with respect to a base station.

In an example embodiment, a wireless communication device includes a reception unit (e.g., a receiver), a storage control unit (e.g., a storage controller), an acquisition unit (e.g., an acquirer), and a transmission unit (e.g., a transmitter). The wireless communication device starts up intermittently. The reception unit receives second serial codes different from a first serial code of the wireless communication device from one or more other wireless communication devices different from the wireless communication device. The storage control unit stores the second serial codes received by the reception unit in a storage unit (e.g., a memory). The acquisition unit acquires the first serial code and the second serial codes from the storage unit. The transmission unit transmits the first serial code and the second serial codes acquired by the acquisition unit.

Hereinafter, an example embodiment will be described using the drawings.

Figure 1:
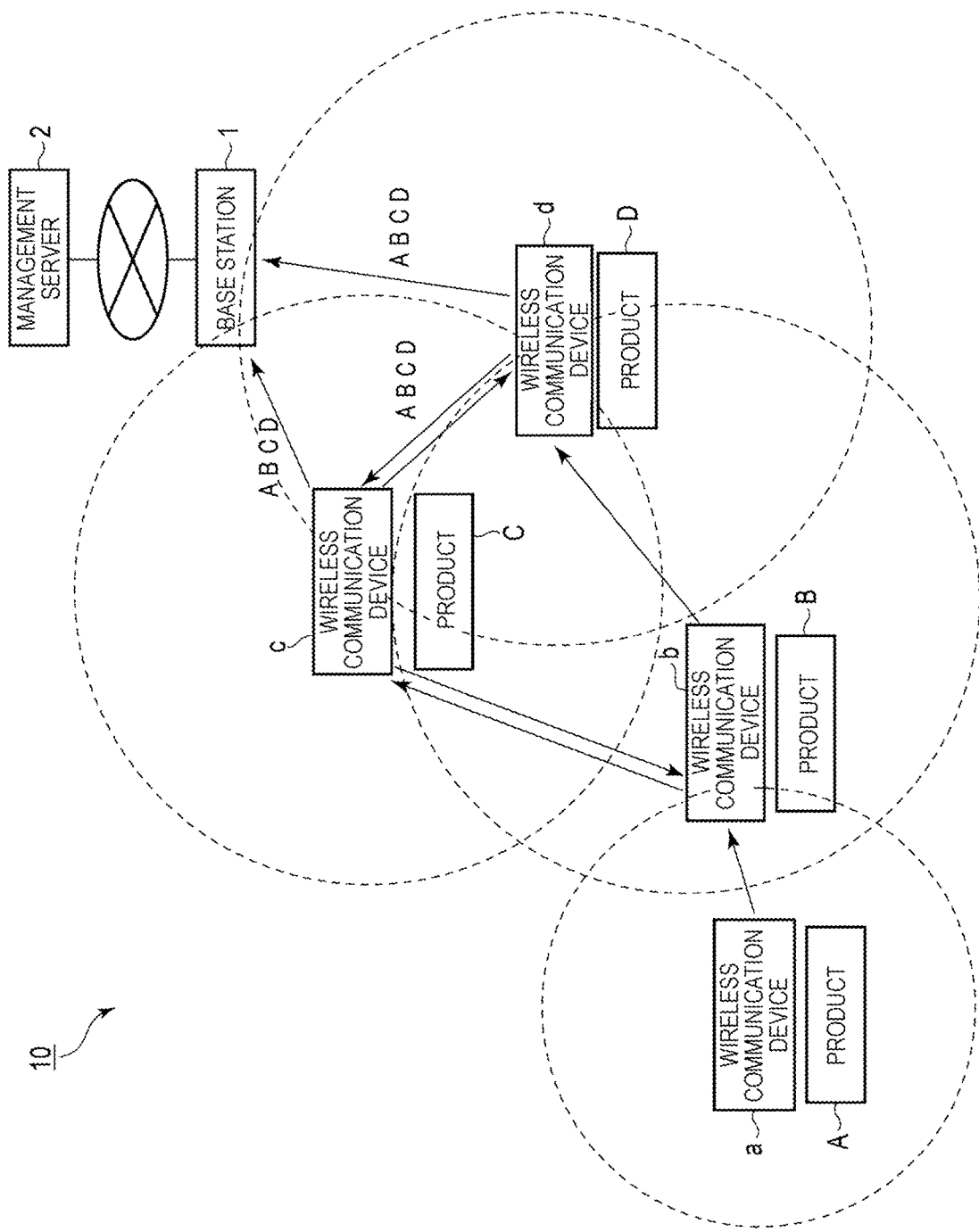
FIG. 1 is a schematic view illustrating a system according to an example embodiment.

FIG. 1 is a diagram illustrating an exterior of a system 10.

The system 10 is a system that collects serial codes of non-operation products on a regular basis in order to track the locations of the non-operation products. The system 10 includes products A, B, C, and D, wireless communication devices a, b, c, and d, a base station 1, and a management server 2. Meanwhile, the number of products and the number of, wireless communication devices are not limited to four.

The products are, for example, POS products. The product includes a specific serial code. A hash code having a unique KEY value added thereto is imparted to the serial code. In FIG. 1, the serial code is indicated by, for example, A, B, C, or D, but may be a code of several digits.

The wireless communication device is attached to a product on a one-to-one basis, and a serial code of the corresponding product is recorded thereon in advance. Each of the wireless communication devices is synchronized with time at the time of shipment. Each of the wireless communication devices are powered by a battery and starts up intermittently in order to reduce battery consumption. For example, the wireless communication devices start up simultaneously at a predetermined time about once every few hours for a predetermined period of time. Meanwhile, the frequency of start-up is not limited to about once every few hours. The predetermined period of time may be, for example, four seconds, but is not limited thereto. The wireless communication devices are capable of communicating with one or more other wireless communication devices or the base station 1 during a start-up period. The wireless communication devices are not capable of communicating with one or more other wireless communication devices or the base station 1 during a period other than a start-up period. For example, the wireless communication devices communicate with one or more other wireless communication devices or the base station 1 which is present within each of communication ranges indicated by ranges surrounded by dashed lines during a start-up period. Meanwhile, the communication range varies depending on radio wave conditions. For example, in FIG. 1, the wireless communication device b may receive the serial code A of the wireless communication device a. The wireless communication device c may receive the serial code B from the wireless communication device b and may receive the serial code D from the wireless communication device d. In addition, the wireless communication device d may receive the serial code B and the serial code A from the wireless communication device b. The wireless communication devices transmit the received serial codes together with their own serial codes.

The base station 1 is a device that transmits the serial code received from the wireless communication device to the management server 2. The base station 1 adds its own positional information and transmits the positional information to the management server 2 through, for example, the Internet.

The management server 2 is a server that manages the location of a product on the basis of a serial code received from the base station 1 for the remote maintenance of the product. The management server 2 can manage only products of the present system by confirming whether or not a product is a product of the present system according to a hash code imparted to a serial code.

A configuration of the wireless communication device will be described.

Here, the wireless communication device d will be described as an example, but the wireless communication devices are similarly configured.

Figures 2, 3:
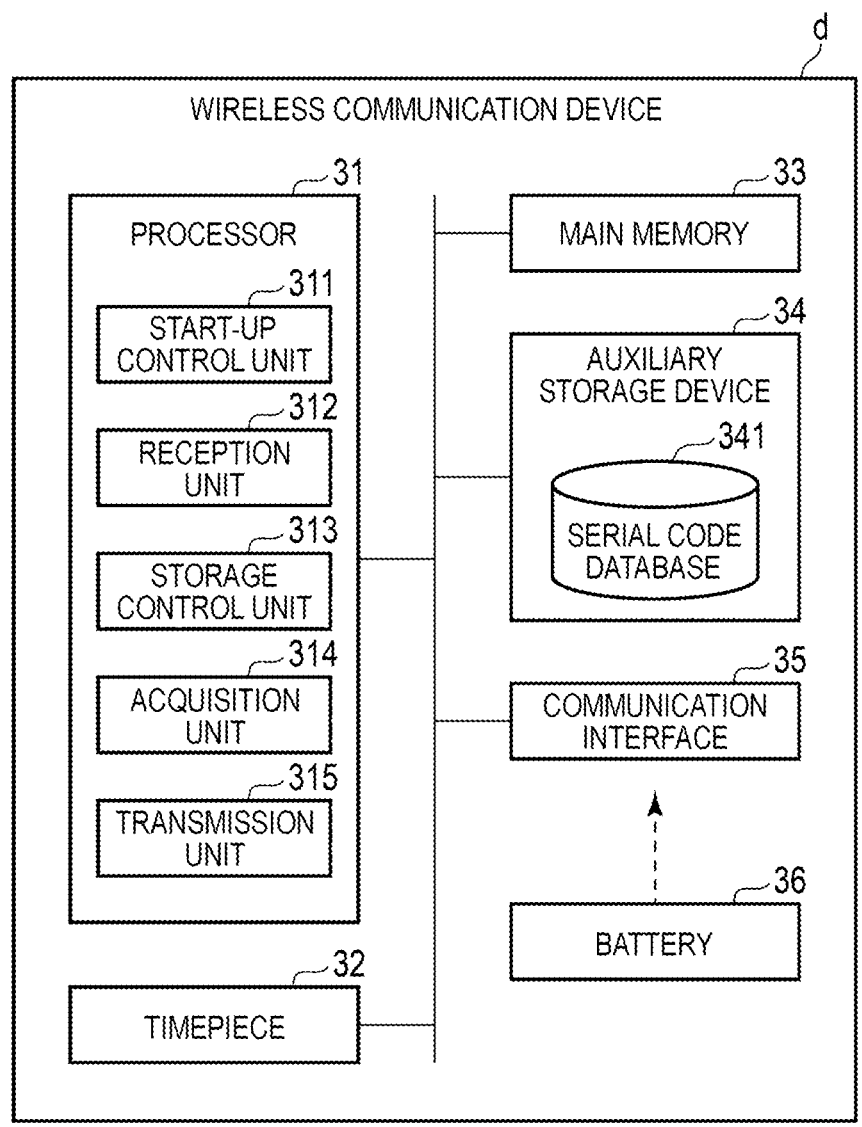
FIG. 2 is a block diagram illustrating a wireless communication device according to the example embodiment.
FIG. 3 is a diagram illustrating a serial code database according to the example embodiment.

FIG. 2 is a block diagram illustrating the wireless communication device d.

The wireless communication device d includes a processor 31, a timepiece 32, a main memory 33, an auxiliary storage device 34, a communication interface 35, and a battery 36. In FIG. 2, an interface is written as "I/F".

The processor 31 is equivalent to a central portion of the wireless communication device d. For example, the processor 31 is a central processing unit (CPU), but is not limited thereto. The processor 31 may be constituted by various circuits. The processor 31 loads programs stored in advance in the main memory 33 or the auxiliary storage device 34 in the main memory 33. The programs are programs causing the processor 31 of the wireless communication device d to realize units to be described later. The processor 31 executes various operations by executing the programs loaded in the main memory 33.

The timepiece 32 tracks time. The timepiece 32 is synchronized with other wireless communication devices at the time of shipment.

The main memory 33 is equivalent to a main storage portion of the wireless communication device d. The main memory 33 includes a nonvolatile memory region and a volatile memory region. The main memory 33 stores an operating system or programs in the nonvolatile memory region. The main memory 33 uses the volatile memory region as a work area in which data is appropriately rewritten by the processor 31. For example, the main memory 33 includes a read only memory (ROM) as the nonvolatile memory region. For example, the main memory 33 includes a random access memory (RAM) as the volatile memory region.

The auxiliary storage device 34 is equivalent to an auxiliary storage portion of the wireless communication device d. For example, the auxiliary storage device 34 is a flash memory or the like. The auxiliary storage device 34 stores the above-described programs, data which is used when the processor 31 performs various processing, and data which is generated through processing performed in the processor 31.

The auxiliary storage device 34 stores a serial code database 341. The auxiliary storage device 34 is an example of a storage unit (e.g., a memory). The serial code database 341 is a database for managing serial codes of respective products and time to live (TTL) values in correlation with each other. The TTL value is an example of a transmission upper limit value. The transmission upper limit value is an upper limit value of the number of transmissions. The TTL value is set for each serial code. A configuration example of the serial code database 341 will be described later. In FIG. 2, the database is written as a "DB".

The communication interface 35 includes various interfaces that communicatively connect the wireless communication device d to other equipment in accordance with a predetermined communication protocol. For example, the communication interface 35 is a wireless controller in a band of 920 MHz.

The battery 36 supplies power to the wireless communication device d. For example, in a product set to be in an unusable state at night or the like, the battery 36 may be charged during an operation state during the day.

Meanwhile, a hardware configuration of the wireless communication device d is not limited to the above-described configuration. The wireless communication device d can be appropriately subjected to omission and change of the above-described components, and addition of new components.

Each unit mounted on the processor 31 mentioned above will be described.

In the processor 31, a start-up control unit (e.g., a start-up controller) 311, a reception unit (e.g., a receiver) 312, a storage control unit (e.g., a storage controller) 313, an acquisition unit (e.g., an acquirer) 314, and a transmission unit (e.g., a transmitter) 315 are mounted. Each unit mounted on the processor 31 can also be referred to as each function. Each unit mounted on the processor 31 can also be mounted on a control unit (e.g., a controller) including the processor 31 and the main memory 33.

The start-up control unit 311 controls the battery 36 at a set start-up time and supplies power to each unit of the wireless communication device d.

The reception unit 312 receives other serial codes different from the serial code of the wireless communication device d from one or more other wireless communication devices different from the wireless communication device d. The other wireless communication devices are, for example, the wireless communication devices c and d within the communication range of the wireless communication device d. The serial code of the wireless communication device d is the serial code D of the product correlated with the wireless communication device d. The serial code of the wireless communication device d is also referred to as a first serial code. The other serial codes are, for example, the serial code A of the product correlated with the wireless communication device a which is received from the wireless communication device a by the wireless communication device b, the serial code B of the product correlated with the wireless communication device b, and the serial code C of the product correlated with the wireless communication device c. The other serial codes are also referred to as second serial codes.

The storage control unit 313 stores the second serial codes received by the reception unit 312 in the auxiliary storage device 34.

The acquisition unit 314 acquires the serial code D of the wireless communication device d and the second serial codes from the auxiliary storage device 34.

The transmission unit 315 transmits the serial code D of the wireless communication device d and the second serial codes acquired by the acquisition unit 314.

Meanwhile, the reception unit 312 and the transmission unit 315 are described as being mounted on the processor 31 by executing programs, but are not limited thereto. The reception unit 312 and the transmission unit 315 may be communicatively coupled to the communication interface 35. The reception unit 312 and the transmission unit 315 may be communicatively coupled between the processor 31 and a device such as the communication interface 35 by executing programs.

A configuration example of the serial code database 341 will be described.

FIG. 3 is a diagram illustrating the serial code database 341.

The serial code database 341 includes a "serial code" item and a "TTL" item.

The "serial code" item is an item indicating a serial code of a product correlated with each wireless communication device which is recorded on each wireless communication device in advance. In the "serial code" item, the serial code D of the wireless communication device d and the second serial codes are set. The "TTL" item is an item indicating a TTL value correlated with each serial code. The serial code D of the wireless communication device d set in the "serial code" item is not correlated with a TTL value. The second serial codes set in the "serial code" item and the TTL value set in the "TTL" item are correlated with each other. Each of the second serial codes and the TTL value correlated with each other are stored as one record.

The wireless communication device d adds a record to the serial code database 341 whenever a new second serial code is received from another wireless communication device. The wireless communication device d deletes a record for a second serial code in which a TTL value is zero from the serial code database 341. The wireless communication device d may update a serial code database by adding and deleting a record to and from the serial code database 341.

A procedure of processing performed by the wireless communication device d will be described.

First, a serial code transmission process will be described.

Figure 4:
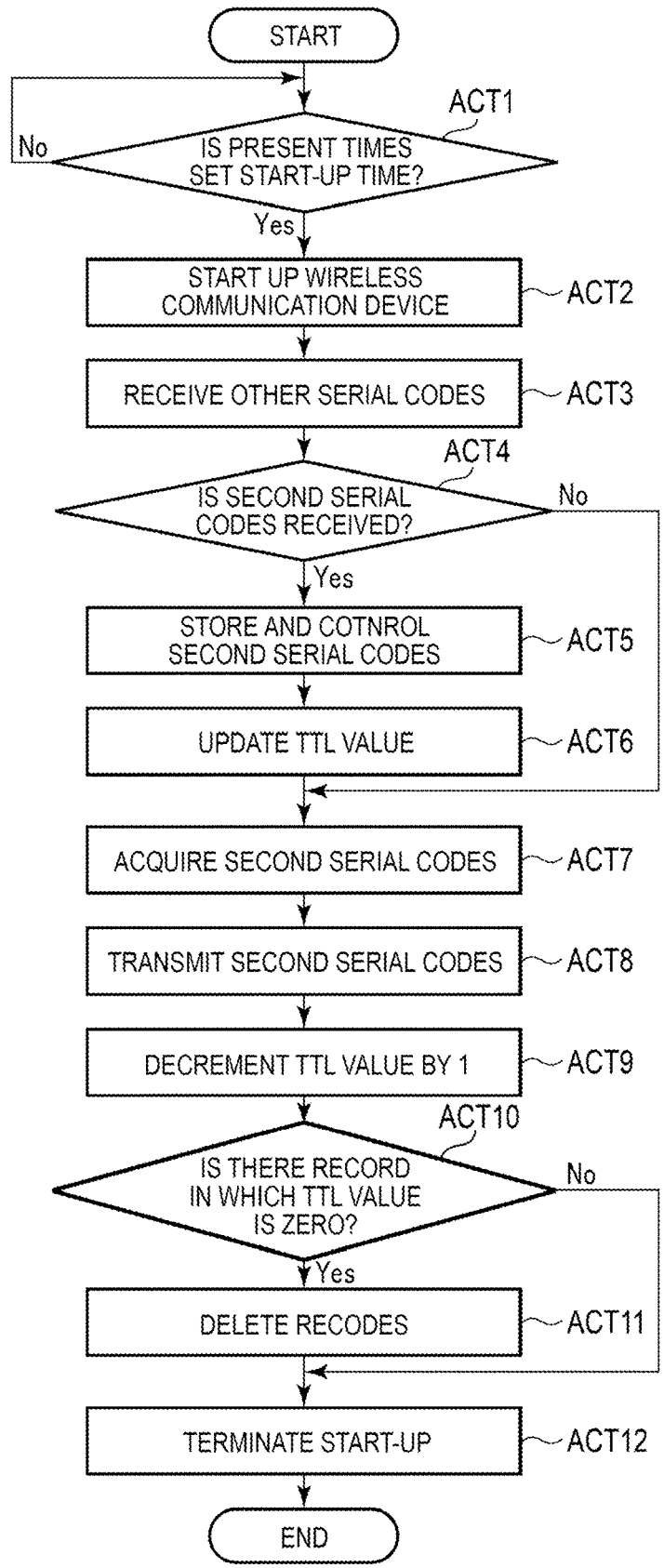
FIG. 4 is a flowchart illustrating a procedure of a serial code transmission process performed by the wireless communication device according to the example embodiment.

FIG. 4 is a flowchart illustrating a procedure of the serial code transmission process.

The wireless communication device d performs the serial code transmission process during the start-up of the wireless communication device d.

The start-up control unit 311 determines whether or not the present times is a set start-up time (ACT1). In ACT1, for example, the start-up control unit 311 determines whether or not the present time is a start-up time with reference to the time tracked by the timepiece 32.

In a case where the present time is not a start-up time (ACT1, NO), the start-up control unit 311 repeats ACT1. In a case where the present time is a start-up time (ACT1, YES), the start-up control unit 311 starts up the wireless communication device d (ACT2). In ACT2, the start-up control unit 311 controls the battery 36 at the start-up time and supplies power to each unit of the wireless communication device d. The wireless communication device d is capable of communicating with one or more other wireless communication devices or the base station 1.

The reception unit 312 receives the second serial codes different from the serial code D of the wireless communication device d from one or more other wireless communication devices different from the wireless communication device d (ACT3). In ACT3, for example, the reception unit 312 receives the second serial codes from one or more other wireless communication devices through the communication interface 35 for a fixed period of time after the start-up time.

The storage control unit 313 determines whether or not the second serial codes are received from one or more other wireless communication devices (ACT4).

In a case where the reception unit 312 does not receive the second serial codes (ACT4, NO), the processing transitions from ACT4 to ACT7. In a case where the reception unit 312 is received the second serial codes (ACT4, YES), the storage control unit 313 stores the second serial codes in the auxiliary storage device 34 (ACT5). In ACT5, for example, the storage control unit 313 stores the received second serial codes in the serial code database 341 of the auxiliary storage device 34 as one record. For example, in a case where the received second serial codes are not stored in the serial code database 341, the storage control unit 313 adds the record of the serial codes. In a case where the received second serial codes are already stored in the serial code database 341, the storage control unit 313 maintains the record of the serial codes.

The storage control unit 313 sets a TTL value as an initial value in correlation with the second serial codes received by the reception unit 312 in ACT3 (ACT6). Meanwhile, the initial value is, for example, "3", but is not limited thereto. For example, in a case where the storage control unit 313 adds the record of the received second serial codes, the storage control unit sets a TTL value of the record as an initial value and stores the TTL value in the serial code database 341. In a case where the record of the received second serial codes is already stored in the serial code database 341, the storage control unit 313 updates the TTL value of the record to the initial value. Regarding the record of the second serial codes that are not received in ACT3, the storage control unit 313 does not update the TTL value. The number of transmissions of the second serial codes can be limited by setting a TTL value for each second serial code. Thereby, in a case where a product is moved, it is possible to prevent the wireless communication device d from unnecessarily transmitting the second serial codes to the base station 1. In addition, the TTL value is set to 2 or greater, and thus the wireless communication device d can transmit the second serial codes a plurality of times. The wireless communication device d transmits the second serial codes a plurality of times, and thus it is possible to increase a possibility that the second serial codes will reach the base station 1 or the other wireless communication devices even when there is an influence of noise, the intensity of radio waves, or the like.

The acquisition unit 314 acquires the serial code D of the wireless communication device d and the second serial codes which are stored in the serial code database 341 from the auxiliary storage device 34 (ACT7). In ACT7, for example, the acquisition unit 314 acquires the second serial codes of which the record is added during a start-up period before the present start-up period from the serial code database 341. In addition, the acquisition unit 314 acquires the second serial codes of which the record is added during the present start-up period in ACT5 from the serial code database 341.

The transmission unit 315 transmits the serial code D of the wireless communication device d and the second serial codes which are acquired by the acquisition unit 314 (ACT8). In ACT8, for example, the wireless communication device d transmits the second serial codes received from the other wireless communication devices together with the serial code D of the wireless communication device d once during the present start-up period. Thereby, it is possible to increase a possibility that the serial codes will reach the base station 1 or the other wireless communication devices. In addition, the transmission unit 315 transmits the second serial codes, received by the reception unit 312 during the present start-up period, during the present start-up period. The transmission unit 315 transmits the second serial codes received during the present start-up period together with the first serial code during the present start-up period, and thus it is possible to secure the immediacy of remote maintenance of a product.

The storage control unit 313 decrements the TTL value in the record stored in the serial code database 341 corresponding to the second serial codes transmitted in ACT8 in the auxiliary storage device 34 by 1 (ACT9). In ACT9, for example, the storage control unit 313 decrements the TTL value correlated with the second serial codes by 1 whenever the transmission unit 315 transmits the second serial codes in the auxiliary storage device 34.

The storage control unit 313 determines whether or not there is a record in which a TTL value is zero (ACT10). In a case where there is no record in which a TTL value is zero (ACT10, NO), the processing transitions from ACT10 to ACT12. In a case where there is a record in which a TTL value is zero (ACT10, YES), the storage control unit 313 deletes the record in which a TTL value is zero from the serial code database 341 of the auxiliary storage device 34 (ACT11).

The start-up control unit 311 terminates start-up after a predetermined period of time elapses from the start-up time (ACT12). In ACT12, for example, the start-up control unit 311 controls the battery 36 so as to stop supplying power to each unit of the wireless communication device d. The wireless communication device d is not capable of communicating with one or more other wireless communication devices or the base station 1.

Meanwhile, in ACT5, an example in which the transmission unit 315 transmits the second serial codes, received by the reception unit 312 during the present start-up period, during the present start-up period is described, but this is not limiting. For example, the transmission unit 315 may transmit the second serial codes, received by the reception unit 312 during the present start-up period, during the next start-up period of the wireless communication device d. The first transmission of the second serial codes, received by the reception unit 312 during the present start-up period, is the next start-up period of the wireless communication device d.

In addition, the transmission unit 315 may determine a transmission timing of a serial code on the basis of the serial code D of the wireless communication device d. The transmission timing is a timing when a serial code is transmitted during a start-up period. For example, the wireless communication devices may determine transmission timings specific to the respective wireless communication devices on the basis of serial codes of the respective wireless communication devices. For example, the wireless communication devices may determine a transmission timing with a pseudo-random number using the serial codes of the respective wireless communication devices as seeds. Thereby, it is possible to vary transmission timings of the respective wireless communication devices and reduce a possibility of serial codes not reaching due to interference.

Meanwhile, an example in which the serial code database 341 is stored in the auxiliary storage device 34 is described, but this is not limiting. The serial code database 341 may be stored in an external device which is independent of the wireless communication device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device having an associated first serial code and configured to start up intermittently, the device comprising:
a receiver configured to receive a second serial code, different from the first serial code, from a second wireless communication device different from the wireless communication device;
a processor configured to:
store the second serial code received by the receiver in a memory,
acquire the first serial code and the second serial code from the memory; and
a transmitter configured to transmit the first serial code and the second serial code,
the receiver being further configured to receive a third serial code different from the first serial code from a third wireless communication device different from the wireless communication device, and
the processor being configured to set a transmission upper limit value as an initial value in correlation with the second and third serial codes received by the receiver in the memory, decrement the transmission upper limit value correlated with the second and third serial codes by a unit amount whenever the transmitter transmits the second and third serial codes, and delete the second and third serial codes when the transmission upper limit value is zero.

2. The device of claim 1, wherein the transmitter transmits the second and third serial codes received by the receiver during a present start-up period or during a next start-up period of the wireless communication device.

3. The device of claim 1, wherein the transmitter determines a transmission timing based on the first serial code.

4. The device of claim 1, wherein the wireless communication device and the second and third wireless communication devices start up simultaneously at a predetermined time for a predetermined period of time.

5. The device of claim 1, wherein the wireless communication device is configured to communicate with the second and third wireless communication devices or a base station during a start-up period.

6. A system for performing wireless transmission of a first serial code and a second serial code, the system comprising:
a wireless communication device associated with the first serial code and configured to start up intermittently, the device comprising:
a receiver configured to receive a second serial code, different from the first serial code, from a second wireless communication device different from the wireless communication device;
a processor configured to:
store the second serial code received by the receiver in a memory; and
acquire the first serial code and the second serial code from the memory; and
a transmitter configured to transmit the first serial code and the second serial code; and
a base station, the base station configured to:
transmit the first serial code and the second serial code received from the wireless communication device to a management server; and
add positional information related to the base station and transmit the positional information to the management server,
the receiver being further configured to receive a third serial code different from the first serial code from a third wireless communication device different from the wireless communication device, and
the processor being configured to set a transmission upper limit value as an initial value in correlation with the second and third serial codes received by the receiver in the memory, decrement the transmission upper limit value correlated with the second and third serial codes by a unit amount whenever the transmitter transmits the second and third serial codes, and delete the second and third serial codes when the transmission upper limit value is zero.

7. The system of claim 6, wherein the management server is configured to manage the location of a product based on the serial code received from the base station.

8. A wireless communication method of a wireless communication device having an associated first serial code starting up intermittently, the method comprising:
   receiving second serial codes different from the first serial code from a second wireless communication device different from the wireless communication device;
   storing the received second serial codes in a memory;
   acquiring the first serial code and the second serial codes from the memory;
   transmitting the first serial code and second serial codes;
   receiving a third serial code different from the first serial code from a third wireless communication device different from the wireless communication device; and
   setting a transmission upper limit value as an initial value in correlation with the second and third serial codes stored in the memory, decrementing the transmission upper limit value correlated with the second and third serial codes by a unit amount whenever the second and third serial codes are transmitted, and deleting the second and third serial codes in which the transmission upper limit value is zero.

9. The method of claim 8, further comprising transmitting the second and third serial codes, which are received during a present start-up period or during a next start-up period of the wireless communication device.

10. The method of claim 8, further comprising determining a transmission timing based on the first serial code.

11. The method of claim 8, further comprising starting the wireless communication devices simultaneously at a predetermined time for a predetermined period of time.

12. The method of claim 8, wherein the wireless communication device is configured to communicate with the second and third wireless communication devices or a base station during a start-up period.

* * * * *